Oct. 7, 1969     E. J. PETNER ET AL     3,471,596

PROCESS OF MAKING FUSED THERMOSETTING DENTAL OBJECTS

Filed March 11, 1966

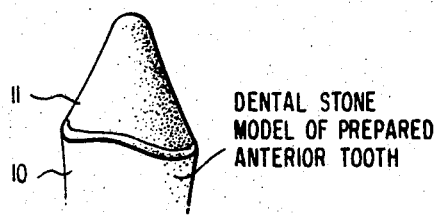

FIG.1 — DENTAL STONE MODEL OF PREPARED ANTERIOR TOOTH

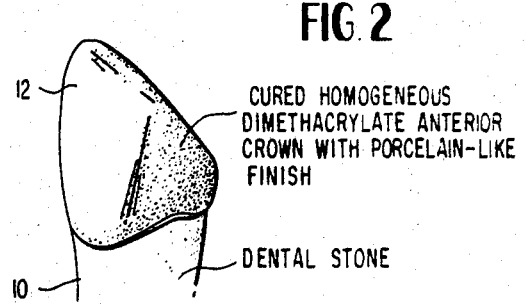

FIG.2 — CURED HOMOGENEOUS DIMETHACRYLATE ANTERIOR CROWN WITH PORCELAIN-LIKE FINISH / DENTAL STONE

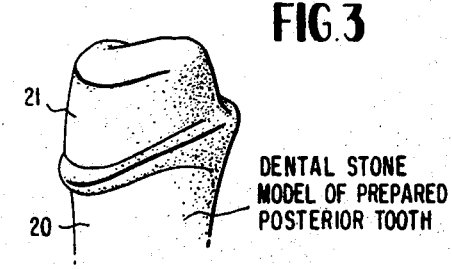

FIG.3 — DENTAL STONE MODEL OF PREPARED POSTERIOR TOOTH

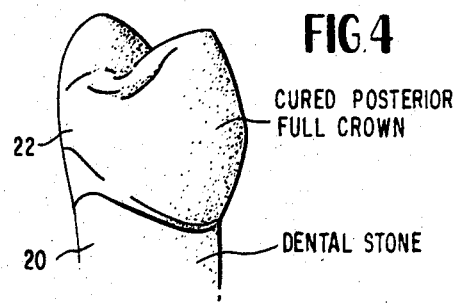

FIG.4 — CURED POSTERIOR FULL CROWN / DENTAL STONE

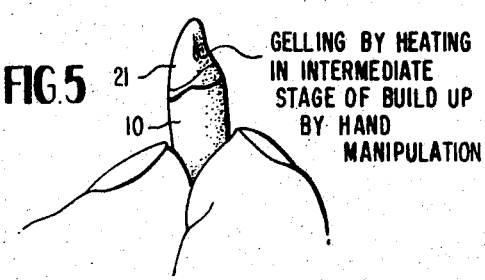

FIG.5 — GELLING BY HEATING IN INTERMEDIATE STAGE OF BUILD UP BY HAND MANIPULATION

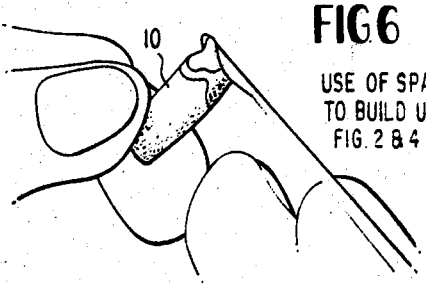

FIG.6 — USE OF SPATULA TO BUILD UP FIG.2 & 4 TOOTH

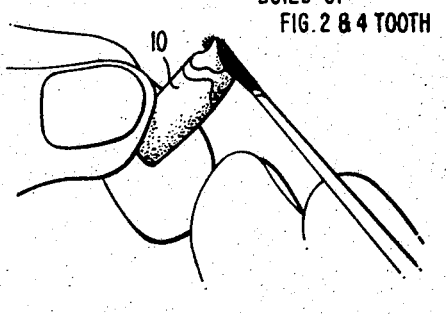

FIG.7 — USE OF BRUSH TO BUILD UP FIG.2 & 4 TOOTH

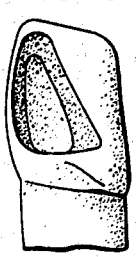

FIG.8

FIG.9 — DENTAL STONE MODEL OF PREPARED TOOTH

INVENTORS
EUGENE J. PETNER
ERWIN BAUMANN
JOHN A. CORNELL

BY Abraham A. Saffitz
ATTORNEY

3,471,596
Patented Oct. 7, 1969

3,471,596
PROCESS OF MAKING FUSED THERMOSETTING DENTAL OBJECTS
Eugene J. Petner, Philadelphia, Pa., Erwin Baumann, Nendeln, Liechtenstein, and John A. Cornell, Philadelphia, Pa., assignors to Williams Gold Refining Co. Inc., Buffalo, N.Y., a corporation of New York
Filed Mar. 11, 1966, Ser. No. 533,687
Int. Cl. A61c 5/10, 13/08; B28b 1/30
U.S. Cl. 264—19     10 Claims

ABSTRACT OF THE DISCLOSURE

A process for manufacturing homogeneous thermosetting fused plastic dental objects such as dental crowns, pontics, inlays and the like and the new products thereby, the process comprising applying a liquid coating of a nonvolatile thickened liquid polyglycol diacrylate or dimethacrylate ester containing a free radical curing agent to a base, the surface of the base having been treated with a parting agent, the polyglycol portion having a degree of polymerization of between 3 and 10 of a glycol selected from the group consisting of ethylene glycol and propylene glycol, and the liquid being thickened with a synthetic resin in the form of thermoplastic particles such as cellulose esters, cellulose ethers, styrene copolymers, acrylonitrile polymers, acrylamide polymers, and acrylic polymers. The thickened coating is supplied in a layer of up to about 2 mm., heated to gel it at a temperature above 125° F., and the coating and gelation operations are repeated until the desired thickness is reached. Final curing is at a temperature of 200–450° F.

---

The present invention relates to a method for the production of dental crowns and industrial objects made from liquid polymerizable plastics which is wholly independent of the requirement for expensive machinery, tools, molds, etc., as have been needed in the prior art methods and have limited their dental and industrial possibilities.

More particularly, the present invention relates to a new process wherein liquid or semiliquid polymerizable substances and mixtures containing a free radical polymerization catalyst are successively applied by hand with a paint brush or a spatula to a dental stone or plaster of Paris form in layers a few millimeters in thickness. These layers are successively gelified and cured by heating or radiation to form a high quality solid product, identical in form and size with the original object. Thus, the object is produced by the simple application of heat or radiation (infrared or ultraviolet) at atmospheric or room pressure and without the need for a mold. The solid product is then stripped from the form.

In the companion application of John A. Cornell, one of the present inventors, Ser. No. 378,457, filed June 26, 1964, now U.S. Patent No. 3,265,202, entitled "Composite Tooth and Veneer Gel Formed of Non-Volatile Dimethacrylate as the Sole Polymerizable Constituent," there is described a storage-stable putty composition consisting of a nonvolatile glycol dimethacrylate, pigment-methyl methacrylate pearls and peroxide. This putty is in essence a package of dental material which can be cut by the technician to the desired dimension and packed into the mold cavity. It is not formed into a product by layering and gelifying.

In application Ser. No. 518,526, filed Jan. 4, 1966, and entitled "Composite Tooth and Veneer Gel Composition Formed of Non-Volatile Dimethacrylate as the Sole Polymerizable Constituent," a division of Ser. No. 378,457, there is described and claimed a molded artificial tooth and the method of making this tooth, the tooth being formed by packing the composition as described in Ser. No. 378,457 into a mold where it is formed about a core of lightly cross-linked, standard acrylic dough and cured at 98–150° C. and 1700 p.s.i. for 6–15 minutes to thereby produce a porcelain-like surface hardness of the finished artificial tooth. It is not formed at room pressure by layering.

The new dough compositions of the present invention are similar to those described in these Cornell applications and are prepared by mixing, at room temperature, transparent beads 0.04–0.2 millimeter in diameter of methyl methacrylate polymer of molecular weight 400,000–1,000,000, preferably 600,000–700,000, with pigment, such as zinc oxide, titanium dioxide, cadmium sulfide, iron oxide, cadmium selenide, carbon black, burnt sienna, etc., and this powder mixture is blended with nonvolatile liquid polyglycol dimethacrylate (glycol $n=3$–10)

in proportions of 1:1 to 3:1 solid to liquid to make putty.

The nonvolatile polyglycol dimethacrylate requires careful mixing because it is very viscous at room temperature, entrapping air bubbles in mixing, the viscosity depending upon the chain length of the polyglycol between the degree of polymerization $n=3$ and $n=10$, and being from about 5 to 100 times the viscosity of methyl methacrylate monomer when tested by the falling ball method. The viscosity of methyl methacrylate monomer of low viscosity is also a problem which must be overcome in preparing the conventional dental dough materials of the prior art and air bubbles form in this monomer. Indeed, there is a substantial body of art which relates to vacuum investing, using methyl methacrylate monomer, in dentistry, as illustrated in the article "Principles of Vacuum Investing" by K. W. Ray appearing in the Dental Laboratory Review for September 1946, page 27, and in Cantor U.S. Patent No. 2,566,596, this patent being restricted to vacuum molding of a methyl methacrylate monomer mix. Air bubbles are entrapped in much greater quantities in the polyglycol dimethacrylates than in methyl methacrylates. As a result, even with very careful molding techniques, porosity develops in the finished dental product. Special outgassing techniques are needed for the strip putty material.

It is surprising to find in the present invention that the viscous polyglycol dimethacrylate material can be used without requiring a mold for finishing and yet achieve dense, non-porous products when applied by hand in accordance with the critical heating requirements of the present invention.

These critical heating requirements will be better understood by referring to the drawing herein, in which:

FIG. 1 shows a dental stone model of a prepared anterior tooth;
FIG. 2 shows the integrally fused and cured crown with porcelain-like finish;
FIG. 3 shows a dental stone model of a prepared posterior tooth;
FIG. 4 shows the cured posterior full crown;
FIG. 5 shows gelling by heating in the intermediate stage in the buildup by hand manipulation;
FIG. 6 shows the use of the spatula to build up the layers of FIG. 2 or 4;
FIG. 7 shows use of brush to build up layers of FIG. 2 or 4;
FIG. 8 shows a stone model of a typical anterior inlay preparation; and
FIG. 9 shows a stone model of a typical posterior inlay preparation.

Referring now to the figures of the drawing, a prefered process of the invention follows.

A base 10 or 20, made of plaster of Paris (dental stone), is prepared in the conventional manner for the desired form, the anterior shown in FIGS. 1 and 2 or the posterior shown in FIGS. 3 and 4.

The first essential step of the present invention is the application to the dental stone base of a lubricant which permits subsequent separation of the finished crown. The lubricant may be any conventional mold lubricant, such as stearic acid, calcium stearate, silicone oil (medium viscosity polydimethyl siloxane 1–50 centipoises), hydrocarbon liquid lubricant, or the like.

The polyglycol dimethacrylate composition, thickened with pearl methyl methacrylate polymer, as in Cornell application Ser. No. 378,457, is applied to the lubricant-coated model in areas denoted 11 and 21 in FIGS. 1 and 3 for anterior and posterior crowns, respectively. Preferably, the composition is preheated to 100° F. to aid in puttying up the intermediate stage. Putting is shown with a spatula in FIG. 6, and with a brush in FIG. 7.

The intermediate stage is heated to gelify the mixture. The following table shows the gelation time and temperature.

TABLE.—TIME FOR SETTING TO INITIAL GELATION OF INTERMEDIATE LAYERS AND OF FINISHING COATING PRIOR TO THE LAST CURING STEP

[Time in Minutes Until Fluidity is Lost (Change from Glossy to Dull Surface)]

| 2 parts dental plasticized MM powder containing 5% crosslinked AM, 1 part liquid TEDMA | 2 parts dental plasticized MM powder, 5% crosslinked AM, 1 part liquid tetra EDMA | 2 parts non-plasticized dental MM powder, 1 part liquid TEDMA | Temperature, °F. |
|---|---|---|---|
| 16 | 18 | 25 | 125 |
| 11 | 11 | 13 | 150 |
| 8 | 8 | 10 | 175 |
| 5 | 5 | 6 | 200 |
| 4 | 6 | 7 | 250 |
| 3½ | 5 | 6 | 275 |

AM=Allyl methacrylate powder containing 0.1–0.3% residual benzoyl peroxide.
TEDMA=Triethylene glycol dimethacrylate.
Tetra-EDMA=Tetraethylene glycol dimethacrylate.

From the above, it is seen that the intermediate layers applied in thicknesses by sable brush, FIG. 7, or by spatula, FIG. 6, gel between ½ hour at 120° F. and 2–3 minutes at 300° F.

The final step is curing the built-up tooth, as in FIGS. 2 and 4, at atmospheric pressure and at a temperature of from 200° F. to 450° F. for a time of between one hour down to about 5 minutes whereby a nonporous full crown is achieved.

The same steps enumerated above are used to build an inlay in stone models such as those shown in FIGURES 8 and 9. The inlay is removed from the stone model, polished, and is then ready for cementation in the tooth.

DISTINCTIONS OF THE COMPOSITIONS OF THE INVENTION SHOWN IN THE TABLE OVER PRIOR ART

The dental dough materials which are conventionally employed in producing dental crowns include self-curing acrylic plastic powder and highly volatile methyl methacrylate liquid for making temporary molded jacket crowns, and highly cross-linked, color-stable, self-curing acrylic plastic powder and highly volatile methyl methacrylate liquid for the formation by molding of permanent jacket crowns.

The dental pieces made with the conventional dental dough materials often are manufactured in a single model only and require special skill, as shown in U.S. Patents Nos. 3,137,894 and 3,217,067, by a very involved process which includes:

(1) The making of a model in stone;
(2) The wax-up of the desired form;
(3) The investment of model and waxed-up form;
(4) The removal of wax form and cleaning;
(5) The placing of the polymer dough mass in the mold prepared above;
(6) Polymerization of the dough;
(7) Removal of the molded article; and
(8) The grinding, polishing and finishing of the article.

The present novel process illustrated in the drawing renders four of these eight steps superfluous and reduces the procedure to the simple hand application of the mass, heat polymerization and finishing.

CRITICAL CHARACTERISTICS OF LIQUID MONOMER

In contradistinction to the volatile methyl methacrylate liquid (boiling point 100° C.) in the prior dental practice, the present process employs a nonvolatile, thermosetting liquid polymerizable polyglycol acrylic diester which is available in the thickened mixture as monomer and is liquid at normal temperatures and at elevated temperatures up to 200° C. Dental methyl methacrylate, if used in the fashion of this invention, would evaporate so quickly as to result in a stony, porous article of no value. The nonvolatile polyglycol dimethacrylate liquid of the invention has a boiling point above 200° C. at 760 mm. of pressure and a flash point not below 130° C., but it is polymerizable by heat and by radiation. In the form of the polymerizate, it displays outstanding mechanical, chemical and electrical properties.

The present diester liquid monomer may be used in a mixture with other nonvolatile (boiling point greater than 200° C.) monomers, or with a partially polymerized acrylic monomer, or with a monomer containing a polymer in solution, or in a mixture of one of these substances with fillers or polymerized plastic.

Because of the desired optical properties, preference will be given to the all-acrylic plastic mixtures which meet the dental requirements, and preferred are the esters of the polyvalent alcohols or polyalcohols of acrylic acid or methacrylic acid or a combination of such esters with polymerizates of various kinds or with fillers.

The liquid composition used in the method of the invention is uniquely characterized by its very low volatility and its long shelf life at room temperature, at least six months or longer, before curing, and by its outstanding wear-resistance and toughness after curing. Both of these attributes are unexpectedly superior to the conventional dental acrylic dough of the prior art.

Preferably, the nonvolatile liquid used in the present process is a difunctional ester of acrylic or methacrylic acid with certain dihydric aliphatic alcohols having 6 to 8 carbon atoms. The preferable resin filler thickening said liquid is a finely divided methyl methacrylate polymer or copolymer of methyl methacrylate. The volatility of monomeric triethylene glycol dimethacrylate, which is a preferred cross-linking monomer phase, is less than the volatility of dibutyl phthalate which is the standard material for nonvolatile plasticizer.

In the preferred embodiment, the solid phase and the liquid phase both consist of an optically transparent acrylic resin to provide a mixed resin having highly desirable transparency qualities but accurate and faithful color and shade reproducibility in the mouth. It is believed that, as a result of the unique characteristics which are inherent in the longer chain cross-linking structure as well as in the ester portion of the molecule, there is provided a beneficial plasticizing action to the cured tooth which decreases brittleness and which is completely surprising, in view of its effectiveness as a cross-linking agent.

The preferred dimethacrylates provide compositions which are completely impervious to water and are also resistant to saponification by chemical agents present in the mouth.

Heating which is applied to the mixture of compositions in the table is capable of being carried out with convection heaters or other heating devices. Indeed, a preferred convection heating device which the inventors have employed with great success is a hot air blower which delivers air at temperatures of 275–650° F., preferably 400–600° F., directly to the site at which the layerwise coating or puttying steps occur. Thus, the particular blowing device which applicants have used brings the hot air through an orifice to localize the heat and control the gelation of the polyglycol dimethacrylate paste or thickened liquid.

The residual peroxide in the beads is adequate to provide a highly efficient cross-linking cure. When the blower is employed to heat the liquid or to heat liquid-powder mixtures applied to a specific location, as illustrated in FIGS. 6 and 7, it is important that the air flow from the blower be less than 15 cubic feet per minute, because beyond this level the 1–2 millimeter coating tends to be blown away and the spreading which is aided by the heat cannot be controlled. If the air flow from the blower is less than 3 cubic feet per minute, there is inadequate heat transfer by convection and the coating material cannot be manipulated in the desired thicknesses.

If the liquid is used without substantial thickening, e.g., by sable brush application, as in FIG. 7, wherein only a few pearls of methyl methacrylate are picked up by the brush, the working time can be much longer than the 25 minutes shown in the table at 125° F.

The data in the table are for mixtures containing a major proportion of polymethyl methacrylate pearls containing residual benzoyl peroxide in the amount of 0.1–0.3%. The pickup of such pearls by sable brush permits the control of the gelling time, and it can be observed by the operator (as pointed out in the title of the table) that the coating, which is initially glossy, becomes dull when dry. By baking the coated tooth in an oven for at least 6–12 minutes with the oven temperature being maintained at 275° F., the tooth is cured and provided with a hard, wear-resistant finish. The oven maintained at other temperatures will result in curing in varying times; thus, at 400° F. a cure is obtained at approximately 3 minutes, while at 200° F. 1 hour is required to obtain final cure.

It is surprising that the material can be placed on a form or in a mold with a brush or spatula while the material is high enough in viscosity to avoid flowing off without the incorporation of air bubbles. It is this attribute which permits the layerwise buildup without introducing air bubbles into the layer or successive layers of the mass.

It is an advantage of the present invention that the product cannot be overcured and thereby made porous. This is in sharp contrast to the molding of conventional volatile methyl methacrylate dental dough compositions which tend to depolymerize at high temperature.

The following are additional examples. The first of the additional examples illustrates preheating of the mixed composition under vacuum.

A model was prepared of dental stone for an anterior tooth as in FIG. 1 and was coated with silicone lubricant. The pigmented composition of the table, column 3, was prepared by adding titanium dioxide pigment, burnt sienna, carbon black and cadmium selenide. These pigments were used in a ratio of 1 part of pigment total to 99 parts of bead polymer. The shade resulting is known as "body shade" and the pigments were thoroughly dispersed into the polymer by ball milling. The mixture of powder and liquid, as in column 3 of the table, was first heated to 104° F. and then exposed to a vacuum of 15 mm. of mercury for 5 minutes. This treatment eliminates air bubbles and is preferred when relatively unskilled personnel, unfamiliar with dental laboratory manipulation, are employed for producing high quality teeth in single models.

The vacuum-treated mixture was then applied to dental stone with a brush and a hot air convector was used to heat the applied mass to cause initial gelation. The process was repeated in separate application of 1–2 mm. thicknesses until the dentine mass was built up to the desired shape, as in FIGS. 2 and 4. The final baking was carried out at 275° F. for 10 minutes, the crown was separated from the dental stone and finished by grinding and polishing in the usual way.

The following example illustrates the use of the composition of column 2 in the table and was carried out in a different, darker shade for the body shade. Instead of using a hot air convector, the tooth was heated in a laboratory oven. A more experienced technician carried out the work and he was able to manipulate the liquid polyglycol dimethacrylate material on the so-heated device to obtain the desired uniformity of coating.

An additional procedure was carried out by the same technician to repair a molded jacket crown made of cross-linked methyl methacrylate containing 10% of ethylene glycol dimethacrylate as the cross-linking agent and plasticized with 10% of dibutyl phthalate. A crack defect was repaired in this crown. The crack was abraded with a grinding machine, coated with a composition of the previous example and built up layer by layer to produce a perfectly bonded repair which matched the original crown in a union so perfect that the two parts could not be separated. In carrying out the repair, the technician was able to use a stream of hot air as well as the oven technique described above.

The integrally fused plastic full dental crown articles made by the present invention are outstanding because of their relatively high density and freedom from porosity, a result which is not expected in view of the teaching of Cantor in U.S. Patent No. 2,566,596. Especially unexpected are the outstanding properties found in the invention of wear-resistance, hardness, toughness without brittleness, aging-resistance and impact-resistance in view of the brittleness of highly strained bulk polymerized dimethacrylate, which is the case for certain diesters, such as ethylene glycol dimethacrylate.

It was expected by those conversant in the art that, as the proportion of ethylene glycol dimethacrylate increases from 10 to 20 in the ethylene glycol dimethacrylate-methyl methacrylate liquid system, the peroxide cured products made at 80° C. become increasingly brittle and increasingly strained. This last characteristic of increasing internal strain means that the mold product in the form of a strip cannot be subjected to grinding or cutting with a sharp tool without fracturing or being liable to fracture along cleavage lines and along internal strain patterns to produce chunks of glossy plastic. These undesirable properties are not encountered with the present material which is surprisingly nonporous when made by coating instead of by molding.

Prior to the present method, it was not expected that one could achieve formable plastic products free from porosity and without the tendency to shatter on grinding and cutting. This shattering is aggravated when cross-linking agents are used as the major component of the monomer phase, especially in the case of bulk polymerized ethylene glycol dimethacrylate. This shattering is also exhibited by bulk polymerized trimethylol propane trimethacrylate, which is highly strained when polymerized with benzoyl peroxide, or when bulk copolymerized with a small amount of methyl methacrylate. This defect, which has made this monomer impractical and noncommercial in the dental area, results in products having poor impact resistance.

If the trimethylol propane trimethacrylate products were especially plasticized and properly polymerized by special techniques to provide complex blends, the hardening to brittleness and the shattering defects might be overcome, but the mixture is very costly to make and not worth while for general industrial or dental use unless blended with linear polyglycol diacrylates.

It was wholly unexpected and surprising that the present nonvolatile polyglycol dimethacrylate cross-linkers constituting the bulk of the phase can be superior in wear resistance to the conventional cross-linked methyl methacrylate liquid paste and can be cured after coating to a nonporous state.

Ethylene dimethacrylate as a monomer in the dough system is further unsuitable because it yields a stiff gel which becomes very hard to work. The minimum glycol length is triethylene glycol for good working properties. Trimethylol propane trimethacrylate is at the other extreme, as far as solvency is concerned, and is a very poor solvent in the dough system. With the dental polymer in an amount used in a preferred composition, no solvation is observed at room temperature and the composition remains sandy so as to be completely unsuitable for forming and curing. Thus the molecule must be linear to avoid brittleness.

The present linear polyglycol diacrylates and dimethacrylates have surprisingly high impact resistance and unusually high solvency properties for other polymers, such as vinyl polymers, acrylonitrile polymers, acrylamide polymers, butadiene copolymers, cellulose esters, cellulose ethers and styrene copolymers, in contrast to the poor solvency of the branched chain trimethylol propane trimethacrylate mentioned above. Poor solvency, in terms of gelation, appears to be a characteristic of the branched chain pentaerythritol polyesters, e.g., the di-, tri- or tetracrylates, or di-, tri- or tetramethacrylates, different from the solvency of the linear molecule herein. It is surprising that such high solvency is exhibited by the linear nonvolatile liquids, such as the triethylene glycol diacrylate or dimethacrylate, the tetraglycol acrylate or methacrylate diesters, the pentaglycol acrylate or methacrylate diesters. The diesters discussed above are those based upon the polyethylene glycols. However diesters of polypropylene glycols may also be used such as tripropylene glycol, tetrapropylene glycol, pentapropylene glycol, etc. The upper limit of the chain length is at the degree of polymerization $n$ where the diester becomes a waxy solid at room temperature, $n=10$. The lower limit is, as explained above, at $n=3$ by reason of the brittle characteristic of the cured object and the undesirable solvency-viscosity attributes exhibited by ethylene glycol dimethacrylate during room temperature mulling operations.

Special synthetic rubber-like polymers may be used imparting outstanding impact resistance when added to the thickened polyglycol dimethacrylate (thickened with methyl methacrylate polymer). A very useful rubbery butadiene styrene copolymer which can be added is one containing from 55–75 parts of butadiene and 45–25 parts of styrene, this copolymer being added in an amount of between 2 and 85%, preferably 5%, to the solid phase, the balance of which consists entirely of methyl methacrylate polymer, the entire solid phase being from 1 to 3 parts per part of liquid polyglycol dimethacrylate in the composition. An equivalent of the butadiene styrene copolymer is the rubbery copolymer of butadiene styrene and acrylonitrile, known in the trade as ABS rubber. This ABS rubber is used in about the same proportions as the butadiene styrene copolymer. Liquid diacrylates and dimethacrylates of the linear polyglycols function in the same way, and the former are particularly useful with these rubbery polymers.

The diacrylate and dimethacrylate compositions of the present invention, based on ABS addition, vinyl resin fillers and equivalent, may be applied for industrial purposes to achieve outstanding results and include new storage-stable putties comprising the nonvolatile linear polyglycol dimethacrylate or diacrylate liquid having a degree of polymerization for the glycol part which is 3 or higher in admixture with pearls of the compatible cellulose, vinyl, butadiene or ethylene polymer which produces a translucent or clear dispersion in the cured product particles.

Vinyl resins, such as vinyl acetate-vinyl chloride copolymer, vinyl acetate-ethylene copolymer, vinyl chloride homopolymer of lacquer grade and polyvinyl acetate, may be added in amounts of from 5% to about 45% to produce improved flow characteristics. Any or all of the foregoing resins may be admixed with each other and with solid methyl methacrylate polymer pearls to make coating compositions which are applied by brush or spatula and cured by hot gas current or infrared radiation in the presence of about 0.1–1.0% of organic peroxide or azo curing agent, e.g., benzoyl peroxide or azoisobutyryl nitrile or ditertiary butyl peroxide.

Cellulose esters, such as cellulose triacetate, cellulose trinitrate, cellulose butyrate, cellulose propionate, and cellulose ethers, such as ethyl cellulose and cyanoethyl cellulose, may be added to the methyl methacrylate thickened polyglycol dimethacrylate liquid in amounts between 5–10% to provide beneficial properties for industrial objects and for repairs. The repairs are processed in accordance with the coating and curing process of the invention.

The foregoing examples illustrate the manufacture and repair of full jack crowns, but the present coating method is of general industrial utility, as well as special utility, in the field of dentistry whenever a non-porous and dense plastic structure is to be built up without the need for expensive molding equipment. The inventors have used the present technique in industrial cases for the production of integrally fused plastic transparent buttons, for repairing cabinets made of various types of thermoplastic (molded cellulose acetate) and for repairing thermosetting materials (phenolic resin, urea resin, etc.). Molded polyester fiberglass articles can be repaired or can be coated and finished in clear and in pigmented surface layers.

One of the present inventors, in application Ser. No. 480,626, filed Aug. 18, 1965, entitled "Process for Making New Dental Crowns Faced With Polyglycol Dimethacrylate," describes and claims the facing of gold crowns with a pigmented composition based upon polyglycol dimethacrylate. It was never recognized that this material could be used to make homogeneous, non-porous, dense dental and industrial objects by the coating method which dispenses completely with molding. Indeed, the present buildup by coating and hot air curing is very much like the crude technique carried out in the jungle and rain forests where rubber trees are tapped and the latex is smoked to form layers and then baled as crude rubber for shipment. One could not foresee that this method of gathering crude rubber for shipment could ever be used to manufacture a high quality, precision formed dental product heretofore made only by molding.

As indicated in the examples, the preliminary warming of the liquid linear polyglycol diacrylate or dimethacrylate is an essential first step which produces the elimination of porosity in the final product and thereby achieves high density. Obviously, various forms of completely homogeneous inlays can also be made and the product may be colored by dye or pigment, striated, clear, cloudy or opaque while retaining the outstanding glossy porcelain-like characteristics of polished acrylic resins. Indeed, the present finished product bears a greater similarity to porcelain than does the conventional acrylic dental powder molded tooth.

For building up the integrally fused plastic object, plaster of Paris or dental stone has been mentioned. Obviously, other heat-resistant materials can be used as long as they are provided with a suitable lubricated or parting surface for removal. Examples of such materials are steel, brass, aluminum, iron, fiberglass reinforced polyester, silicone rubber and carbon.

Having thus disclosed the invention, what is claimed is as follows.

We claim:
1. A process for the manufacture of homogeneous thermosetting resin dental object comprising:
   (a) applying a coating of a nonvolatile thickened liquid polyglycol diacrylate or dimethacrylate ester containing a free radical curing agent to a form whose surface is treated with a parting agent, said polyglycol portion having a degree of polymerization of between 3 to 10, the glycol of the polyglycol portion being ethylene glycol or propylene glycol, and the liquid being mixed with a thickening agent consisting of a thermoplastic resin in the form of particles, the thickening agent being selected from the group consisting of cellulose esters, cellulose ethers, styrene copolymers, acrylonitrile polymers, acrylamide polymers and acrylic polymers;

(b) the thickened coating being applied in a thickness of up to about 2 millimeters and heating said coating to an intermediate gelation stage at a temperature of above 125° F.;

(c) repeating the coating and intermediate gelation operations as in (a) and (b) above until the desired thickness of successively gelled layers is achieved; and (d) finally curing at a temperature of 200° F.–450° F. for a period of time from 1 hour down to 5 minutes, whereafter the object may be removed from said form.

2. A process as claimed in claim 1, wherein said thickening agent is methyl methacrylate polymer of molecular weight 400,000–600,000 and contains 0.1–0.3% residual benzoyl peroxide as the free radical polymerization agent.

3. A process as claimed in claim 2, wherein said methyl methacrylate polymer is present in an amount of from 1–3 parts for each part of said liquid diester.

4. A process as claimed in claim 3, wherein said methyl methacrylate polymer is cross-linked with allyl methacrylate.

5. A process as claimed in claim 3, wherein said methyl methacrylate polymer is plasticized with up to 10% of a nonvolatile ester plasticizer.

6. A process as claimed in claim 3, wherein the base is a heat-resistant form and wherein the finally cured integrally fused plastic object and said form are heated together in the final curing step.

7. A process as claimed in claim 3, wherein said object is an integrally fused plastic dental crown.

8. A process as claimed in claim 3, wherein said object is an integrally fused plastic pontic.

9. A process as claimed in claim 4, wherein said object is an integrally fused plastic inlay.

10. A process as claimed in claim 1 wherein heating is carried out with hot air.

References Cited

UNITED STATES PATENTS

| | | | |
|---|---|---|---|
| 2,120,006 | 6/1938 | Strain | 260—885 |
| 2,335,133 | 11/1943 | Renfrew | 260—885 |
| 2,468,094 | 4/1949 | Marks | 260—885 |
| 2,993,789 | 7/1961 | Crawford | 260—885 |
| 3,066,110 | 11/1962 | Cornell | 260—885 |
| 3,247,289 | 4/1966 | Sears | 260—885 |
| 3,265,202 | 8/1966 | Cornell | 260—41 |

JULIUS FROME, Primary Examiner

A. KOECKERT, Assistant Examiner

U.S. Cl. X.R.

32—12; 260—885; 264—20, 255, 308